United States Patent Office 3,277,139
Patented Oct. 4, 1966

3,277,139
PROCESS FOR PREPARING ORGANIC
POLYISOCYANATES
Eugene L. Powers, New Martinsville, W. Va., assignor to Mobay Chemical Company, Pittsburgh, Pa., a corporation of Delaware
No Drawing. Filed June 13, 1963, Ser. No. 287,523
6 Claims. (Cl. 260—453)

This invention relates to organic polyisocyanates and more particularly to a method of preparing mixtures of organic polyisocyanates which have improved clarity.

It has been proposed heretofore to prepare organic polyisocyanates by reacting an aromatic amine with an aldehyde or ketone in a first step and to phosgenate the resulting mixture of polyamines to prepare a mixture of organic polyisocyanates. In the reaction of the aromatic amine with the aldehyde or ketone, an acid catalyst is used and it has been proposed heretofore to use more than 50 percent of the stoichiometric quantity of the acid catalyst based on the primary amino groups. When these quantities are used, a product is obtained on phosgenation of the amine which contains a great deal of sediment, especially on prolonged storage. Thus, when using the amines of the prior art, it is very difficult to obtain reproducible results in producing organic polyisocyanate from these amines. Such a process is disclosed in U.S. Patent 2,683,730.

It is, therefore, an object of this invention to provide a process for the preparation of organic polyisocyanates which have improved clarity. Another object of this invention is to provide for organic polyisocyanates which have better physical properties and particularly which have less sediment than the heretofore known organic polyisocyanates. Still another object of this invention is to provide an improved method of preparing organic polyisocyanates. A further object of this invention is to provide organic polyisocyanates which have reduced tendency to solidify on prolonged storage. Still another object of this invention is to provide organic polyisocyanates which are liquid over a wider temperature range than the heretofore known organic polyisocyanates. Still another object of this invention is to provide organic polyisocyanates which have a reduced tendency to crystallize, low sediment and desirable viscosities.

The foregoing objects and others which will become apparent from the following description are accomplished in accordance with this invention, generally speaking, by providing organic polyisocyanates prepared by phosgenation of an amine which has been prepared by reacting an aryl amine having one benzene ring with formaldehyde or a precursor thereof in the presence of less than 50 percent of the acid catalyst required to react with said amine and in such proportions that the amine for phosgenation contains from about 40 percent to about 65 percent diamines and the balance higher polyamines. In accordance with a preferred embodiment of the invention, isocyanates are provided which result from phosgenation of the amine prepared by condensing aniline with formaldehyde in the presence of less than 50 percent of HCl required to react with the aniline, the proportions of aniline to formaldehyde being such that the initial amine product contains from 40 percent to 65 percent methylene dianiline and the balance triamines and polyamines. One of the main advantages of the invention is that the resulting mixture of organic polyisocyanates has a very low level of sediment, both initially and on prolonged standing. Sediment in the mixture of organic polyisocyanates prepared by the process of this invention without any filtration or other separation method is usually less than 0.5 percent by weight. Still further, the products prepared in accordance with this invention have a realtively low viscosity which is preferably less than 500 cps./25° C. Another advantage of the invention is in the processing of the amine to prepare it for phosgenation. Since less acid is used than that required to react with all of the amino groups, there is less acid present in the amine product to be removed before the amine is phosgenated to prepare the mixture of isocyanates of the invention. This results in a considerable saving in both raw materials and handling.

It must be pointed out that each of the limitations set forth above are critical. There must be less than 50 percent of the acid catalyst required to react with the amine when a product is prepared which has 40 to 65 percent of diamine. When less than 40 percent of the product is diamine, more than 50 percent acid can be tolerated and this has been inadvertently disclosed in German Patent 946,138. There, the diamine content of the product was never to exceed 40 percent and, consequently, more than 50 percent of the acid required to react with the starting amine could be tolerated. It cannot be over emphasized that in this application less than 50 percent, preferably less than 5 percent, of the acid catalyst required to react with the starting amine is used because the product prepared must have from 40 to 65 percent diamine and the balance higher polyamines. Outside these ranges, there is a marked tendency for the product to have such an amount of sediment that it is unusable commercially, for example, for the preparation of polyurethane foam in a high-speed mixer.

Any suitable aryl amine having one benzene nucleus and at least one replaceable hydrogen atom is contemplated. It is preferred that the benzene nucleus be substituted by not more than one radical or other substituent such as, chlorine, bromine, nitro and the like and that it have one or two free primary amino groups. When the benzene nucleus is substituted by a radical, it is preferably a lower alkyl radical such as, methyl, ethyl, propyl and the like. Aniline is the preferred amine. However, other amines are within the scope of the invention including, for example, chloroaniline, ortho-, meta-, and para-toluidine; ortho-, meta-, and para-phenetidine; ortho-, meta-, and para-anisidine; ortho-, meta, and para-xylidine; ortho-, meta-, and para-xenyl amines, nitroaniline, 2,4-tolylene diamine, and the like.

Any suitable catalyst for the condensation of said amine with said aldehyde may be used, but it is preferred to use a strong Lewis acid including for example, hydrochloric acid, sulfuric acid, perchloric acid, hydrobromic acid, boron trifluoride, tin tetrachloride, phosphorous trichloride, phosphorous oxychloride, thionyl chloride, aluminum trichloride, iodine, bromine, benzoyl chloride, phthalyl chloride, benzyl chloride and the like.

Any suitable precursor of formaldehyde may be used such as, for example, paraformaldehyde, methylal and the like.

For the purpose of this invention, it is important to consider that the process for the preparation of the organic polyisocyanate begins with the preparation of the mixture of polyamines, since it is necessary to carefully control the preparation of the amine in order to produce the polyisocyanate having improved clarity. When the term "clarity" is used in this application, it refers to the amount of sediment in the resulting product. The product has good clarity if it contains less than 0.5 percent by weight of sediment and has a viscosity of less than 500 cps./25° C. Moreover, it is an essential feature of this invention that the reaction between the amine and the formaldehyde be carried out in such proportions of these two reactants that an amine product is obtained which has from about 40 percent to about 65 percent of diamine and the balance higher polyamines. (Below 40 percent, viscosity of the isocyanates prepared from these amines may be too high, above 65 percent, diisocyanate in the resulting mixture of polyisocyanates may freeze out at low temperatures.) A ratio of aniline to formaldehyde within the range of from about 1.5 mols of aniline per mol of formaldehyde to about 3 mols of aniline per mol of formaldehyde may be used.

In accordance with a preferred embodiment of the invention the aniline and acid catalyst are first mixed and reacted together and then the resulting mixture of the acid salt such as, for example, aniline hydrochloride and aniline, is reacted with formaldehyde batchwise or continuously to produce the mixture of methylene dianilines and higher polyamines. The amine product is then neutralized with an approximately stoichiometric amount of a base or a slight excess thereof such as sodium hydroxide, potassium hydroxide or the like and then the amine is separated by decantation and distillation to remove the water and filtration to remove the resulting salt.

While a batchwise condensation may be used, it is preferred that the reaction be carried out under conditions which will cause turbulent flow at a Reynolds number of from about 4500 to about 100,000, and preferably in the range of about 10,000 to 100,000. Any suitable method of carrying out mixing which will give this Reynolds number is satisfactory. If the Reynolds number is allowed to fall below about 4500, there is often a plugging of the equipment, and moreover, the mixing is insufficient to yield a satisfactory product because the ratio of components varies. A satisfactory mixing device for obtaining the turbulence required in the method of this invention can be of simple construction. For example, a ¼ inch pipe may be used to form an L with another ¼ inch pipe and at the base of the L, an additional pipe may be coupled to provide for injection of one component into the other. In such equipment, the pipe in the base of the L may be of, for example, ¼ inch outside diameter stainless steel tubing, which is inserted into the ¼ inch iron pipe with a coupling which permits the injection end of the pipe to pass the injection point of the L so that when amine salt is injected through the L position, an aqueous solution of aldehyde may be injected through the stainless steel tubing, and particularly through a 1/32 inch hole in the end of the stainless steel tubing to produce very high turbulence in the mixing zone. Of course, the pipes may be jacketed for either cooling or heating of the reaction mixture and suitable valves may be provided so that the turbulent reaction mixture is continuously drawn off to a tower for digestion of the intermediate product followed by neutralization and separation of the resulting product. It may be desirable in some cases to separate the addition of one component and the other and use various injection nozzles along the pipe reactor; or various points of introduction without nozzles may be provided, so long as turbulent flow is created throughout at least a portion of the continuous reaction zone.

The initial product from the turbulent zone is preferably digested in a separate digestion zone. Any suitable method for carrying out the digestion of the initial reaction product to achieve complete reaction and the ensuing separation of the organic and inorganic layer may be used. The digestion step is dependent on time, temperature and catalyst concentration. If one is willing to suffer the disadvantage of extended reaction times, then low temperatures may be employed from, e.g. room temperature to, for example, 75° C. Temperatures above 75° C. are preferred however, in the interest of shortening the digestion period. Digestion is preferably accomplished in two stages and is continued in any case until digestion is substantially complete. The two stage process preferably takes place in an initial stage at 50° to 90° C. and in a second stage at a temperature between about 90° C. and about 150° C. In this event, total digestion times will be less than about six hours. The material from the digestion step is then placed in another vessel which has caustic in it in an amount sufficient to react with the hydrochloric acid initially used, and preferably in a stoichiometric amount. The material is thus neutralized at about 75° to about 100° C. preferably 90° C., for optimum separation of the organic and inorganic layer. It helps in the neutralization step to agitate the product. The desired organic layer is drained from the bottom of the reaction mixture, and the amine product is put into a distillation apparatus where excess aniline and water are distilled off. The crude mixture of amines may then be filtered to remove any residual salt. Of course, it is also possible to distill out the various lower isomers, but separation of the higher polymers from each other is very difficult. It is preferred in accordance with the invention to use the initial product containing both diamines and higher polyamines for further reaction with phosgene to prepare a mixture of organic polyisocyanates.

The mixture of amines obtained in accordance with this invention may then be phosgenated to prepare a mixture of organic polyisocyanates. Any suitable phosgenation reaction may be used such as that disclosed, for example, in U.S. Patents 2,683,160; 2,683,730; 2,875,226 and the like. It is preferred in accordance with the present invention to carry out the reaction of the mixture of amines with phosgene in two stages; by first reacting phosgene with the mixture of amines to form a carbamyl chloride-amine hydrochloride slurry and subsequently reacting the slurry with further phosgene to form the mixture of isocyanates. The first stage is preferably carried out at a temperature of from about −20° C. to about 90° C. and the second stage is preferably carried out at a temperature of from about 90° C. to about 200° C. Thus, in accordance with the method of the present invention which involves the preparation of organic polyisocyanates, the phosgene and the mixture of amines are conducted at such a temperature that the isothermic reaction occurring when these two components are combined is not substantially above about 90° C. and then the carbamyl chloride-amine hydrochloride slurry is reacted with further phosgene at a temperature above about 90° C. to prepare the organic polyisocyanate. It is also preferred to carry out the phosgenation of the amine in an inert organic solvent. For this purpose, both the amine and the phosgene are premixed with the organic solvent and then reacted in solution in two stages as set forth above to prepare the organic polyisocyanate. It is preferred to use a high-speed mixer for contacting the phosgene solution and amine solution in the preparation of the initial carbamyl chloride-amine hydrochloride slurry.

Any suitable high-speed mixer is contemplated by a preferred embodiment of the invention such as, for example, turbomixers, colloid mills, pumps including centrifugal pumps, and the like which contain structural elements which rotate at high speeds and thus insure intimate contact between the amine and phosgene within a relatively short period of time. Preferably, the high-speed mixer should be one which rotates at a speed of about 100 r.p.m. or more.

Any suitable organic solvent which is inert to the amine, to the resulting isocyanate and to phosgene may be used. Thus, suitable solvents are, for example, those which have the formula:

wherein R is the same or different and is lower alkyl, hydrogen, halogen, nitro, aryloxy, alkoxy, as well as hydrocarbons, ethers, esters and the like. Any suitable lower alkyl group may be used and those which contain from 1 to 4 carbon atoms are preferred such as, for example, methyl, ethyl, propyl, isopropyl, butyl, tertiary butyl as well as alkylene radicals yielding fused ring systems, for example, a butylene radical as indene and the like. Any suitable halogen may be used such as, for example, chlorine, bromine, iodine, fluorine and the like. Any suitable aryloxy radical may be used such as, for example, phenoxy, cresoxy, ethylphenoxy, and the like. Any suitable alkoxy radical may be used such as, for example, ethoxy, methoxy, propoxy, butoxy and the like. Furthermore, mixtures of hydrocarbons such as kerosene may be used. Examples of specific compounds are benzene, toluene, xylene, chlorobenzene, o-dichlorobenzene, tetrahydronaphthylene, 2,4-dichlorotoluene, 4,4'-dichlorodiphenyl, nitrobenzene, cyclohexane, durene, o-, m-, p-cymenes, dodecyl naphthylene ethyl acetate, diphenyl and the like.

Likewise, any suitable inert organic solvent including those just mentioned may be used for forming the solution or suspension of amine. The amount of amine and phosgene in the solution or suspension may be varied over a wide range without adversely affecting the yield to the extent that the yield is affected by similar variations in heretofore known phosgenation.

The mixture of polyisocyanates prepared from amines which have been prepared in the presence of a low amount of acid and preferably from 1 to 15 percent of the amount of acid required to react with all of the amine end products have a greatly reduced tendency to crystallize so that they have improved clarity. These organic polyisocyanates are useful for the production of polyurethane plastics and particularly polyurethane foam because the mixing equipment used for polyurethane foam is often blocked by the heretofore known sediment-bearing polyisocyanates. The resulting foams are useful for both sound and thermal insulation, for example, in the walls of a dwelling and the like.

The invention is further illustrated by the following examples in which parts are by weight unless otherwise specified.

*Example 1*

The amines used to prepare the mixture of polyisocyanates were prepared in the following manner. A solution of 36 percent HCl was reacted with aniline to give the desired molar ratio of aniline to HCl as shown in the following table. The aniline HCl solution was adjusted to the temperature desired for condensation as shown in the table, and maintained at that temperature while 37 percent formaldehyde solution in water was added to said aniline hydrochloride solution; agitation of the mixture was done throughout the addition of reactants. The reaction product was digested at 100° C. with agitation over the required time period. The digested product was neutralized with concentrated caustic soda solution, and the residual water and aniline removed.

| Percent of the theoretical HCl employed | Aniline/CH₂O, molar ratio | Condensation temp., ° C. | Digestion time, hrs. | Diamine in amine prod., Percent |
|---|---|---|---|---|
| 12.5 | 1.6 | 50–55 | 2 | 47.2 |
| 40 | 1.6 | 50–55 | 3 | 49 |

The above amines were phosgenated in the following manner to prepare the mixture of polyisocyanates. A 15 percent solution of the amine in monochlorobenzene was reacted with a 15 percent solution of the phosgene in monochlorobenzene, such that a 150 percent excess of phosgene was present, in a high-speed mixer. Reaction temperature in said mixer did not exceed 50° C. The product of said mixer was heated with additional phosgene to 130° C. for 1 hour to complete the reaction and remove HCl. The final product of mixed polyisocyanates was obtained by removing the solvent under conditions that do not exceed 160–165° C.

The mixed polyisocyanates upon storage for four months at room temperature showed no material separation. The solution remained clear.

It is to be understood that the foregoing examples are given for the purpose of illustration and any other suitable amine, catalyst or the like could be used provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method of preparing a mixture of organic polyisocyanates having improved clarity which comprises reacting phosgene with a mixture of amines prepared by a process which comprises condensing in the presence of an acid catalyst, an aryl amine having one benzene nucleus and one or two primary amino groups with a member selected from the group consisting of formaldehyde and precursors thereof and digesting the reaction mixture at a temperature of at least 75° C. to yield a mixture of amines containing from about 40 percent to about 65 percent diamines and the balance higher polyamines in the presence of less than about 40 percent of the acid catalyst required to react with said aryl amine.

2. The method of claim 1 wherein said aryl amine is aniline.

3. The method of claim 1 wherein said acid catalyst is HCl.

4. A method of preparing a mixture of polyisocyanates having improved clarity which comprises reacting phosgene with a mixture of amines prepared by a process which comprises condensing in the presence of an acid catalyst aniline with formaldehyde and digesting the reaction mixture at a temperature of at least 75° C. to yield a mixture of amines containing from about 40 percent to about 65 percent of methylene dianiline and the balance triamines and higher polyamines in the presence of 1 to 15 percent of the HCl required to react with said aniline.

5. The method of claim 4 wherein the amount of HCl is about 1 to about 5 percent of the amount required to react with said aniline.

6. A method of preparing a mixture of organic polyisocyanates having improved clarity which comprises reacting phosgene with a mixture of amines in two stages, the first stage being carried out by reacting phosgene with a mixture of amines to form a carbamyl chloride-amine hydrochloride slurry at a temperature of from about −20° C. to about 90° C. and heating the resulting slurry in a second stage at a temperature of from about 90° C. to about 200° C. to form a mixture of isocyanates, said mixture of amines containing from about 40% to about 65% diamines and the balance higher polyamines, said mixture of amines having been prepared, in the presence of an acid catalyst, by condensing aniline with formaldehyde initially at a temperature of from about 50° C. to about 90° C. in the presence of less than about 40% of an acid catalyst required to react with all of the starting amine and then digesting the reaction mixture in a second stage at a temperature of from about 90° C. to about 150° C.

References Cited by the Examiner

UNITED STATES PATENTS

| | | | |
|---|---|---|---|
| 2,683,730 | 7/1954 | Seeger et al. | 260—453 |
| 2,938,054 | 5/1960 | Demers et al. | 260—453 XR |

FOREIGN PATENTS 946,138  7/1949  Germany.

CHARLES B. PARKER, *Primary Examiner.*

DALE R. MAHANAND, *Assistant Examiner.*